United States Patent [19]

Guillemot

[11] Patent Number: 5,158,132

[45] Date of Patent: Oct. 27, 1992

[54] ZONE-REGULATED HIGH-TEMPERATURE ELECTRIC-HEATING SYSTEM FOR THE MANUFACTURE OF PRODUCTS MADE FROM COMPOSITE MATERIALS

[76] Inventor: Gérard Guillemot, Route de Saint-Vincent de Tyrosse, Angresse 40150 Hossegor, France

[21] Appl. No.: 768,583

[22] PCT Filed: Mar. 19, 1990

[86] PCT No.: PCT/FR90/00184

§ 371 Date: Sep. 20, 1991

§ 102(e) Date: Sep. 20, 1991

[87] PCT Pub. No.: WO90/11173

PCT Pub. Date: Oct. 4, 1990

[30] Foreign Application Priority Data

Mar. 20, 1989 [FR] France ............... 89 03562

[51] Int. Cl.[5] .................. B29C 33/02; B29C 33/04; B30B 15/06
[52] U.S. Cl. ............................. 165/30; 165/61; 165/64; 165/168; 100/93 P; 425/143; 425/407; 425/DIG. 13; 219/243; 219/446; 219/449; 219/458; 156/583.1; 156/583.4; 156/498
[58] Field of Search ............ 425/143, 407, DIG. 13; 100/93 P; 165/30, 61, 64, 168; 156/498, 583.1, 583.4; 219/243, 446, 449, 458

[56] References Cited

U.S. PATENT DOCUMENTS

| 987,293 | 3/1911 | Gale | 219/446 |
|---|---|---|---|
| 1,357,343 | 11/1920 | Novotny | |
| 3,286,077 | 11/1966 | Radford et al. | 156/583.4 |
| 3,393,292 | 7/1968 | Ritscher | 100/93 P |
| 3,568,595 | 3/1971 | Bunting | 100/93 P |
| 3,594,867 | 7/1971 | Pfeiffer | 100/93 P |
| 3,624,836 | 11/1971 | Rohdin | 219/243 |
| 3,635,626 | 1/1972 | Pfeiffer | 100/93 P |
| 3,685,932 | 8/1972 | Pfeiffer | 100/93 P |
| 3,754,499 | 8/1973 | Heisman et al. | 100/93 P |
| 3,775,033 | 11/1973 | Pfeiffer | 425/407 |
| 3,998,580 | 12/1976 | Pfeiffer | 100/93 P |
| 4,508,670 | 4/1985 | Janke | 425/143 |
| 4,659,304 | 4/1987 | Day | 100/93 P |
| 4,723,484 | 2/1988 | Held | 100/93 P |
| 4,854,026 | 8/1989 | Averdick et al. | 100/93 P |
| 4,888,973 | 12/1989 | Comley | 219/243 |
| 4,923,556 | 5/1990 | Kettelhoit et al. | 100/93 P |
| 4,964,943 | 10/1990 | Krüger et al. | 100/93 P |

FOREIGN PATENT DOCUMENTS

| 0282805 | 9/1988 | European Pat. Off. |
| 3032422 | 3/1982 | Fed. Rep. of Germany |
| 894040 | 12/1944 | France |
| 2383773 | 10/1978 | France |
| 58-36409 | 3/1983 | Japan |
| 59-142108 | 8/1984 | Japan |
| WO87/06876 | 11/1987 | PCT Int'l Appl. |

Primary Examiner—John K. Ford
Attorney, Agent, or Firm—Rosen, Dainow & Jacobs

[57] ABSTRACT

The present invention provides heater equipment for heating to high temperature and intended to be mounted on a rigid mechanical support (66) in particular the table of a press for manufacturing products made of plastic material or of composite materials. The equipment comprises a heat distribution plate (60) which is heated in multiple zones by a heater submodule (61) comprising a plurality of one piece flat metal-clad heater elements (62) which are spaced apart by spacer blocks (63) and which are distributed over at least three different zones. Each heater element (62) includes at least three resistances (X1, X2, X3). The heater zones are fed with electric power independently from one another by electronic power feed means for each zone, with the power being fed as a function of predetermined references for each zone in co-operation with temperature sensors.

10 Claims, 17 Drawing Sheets

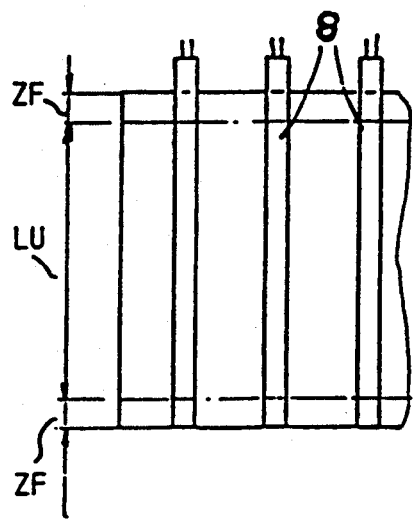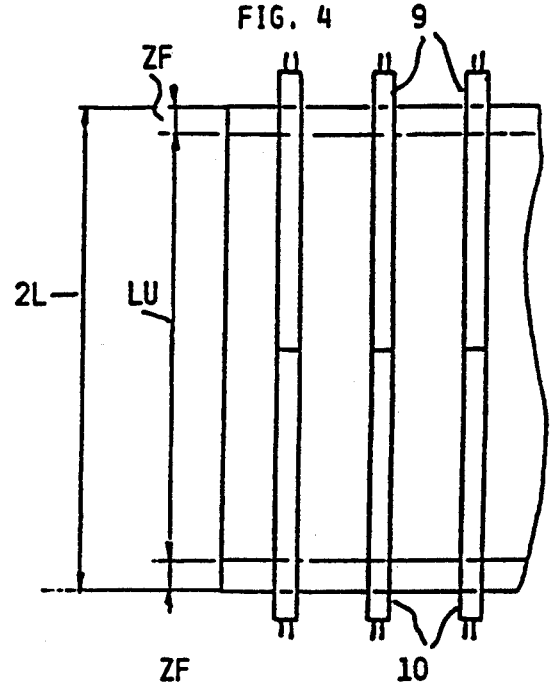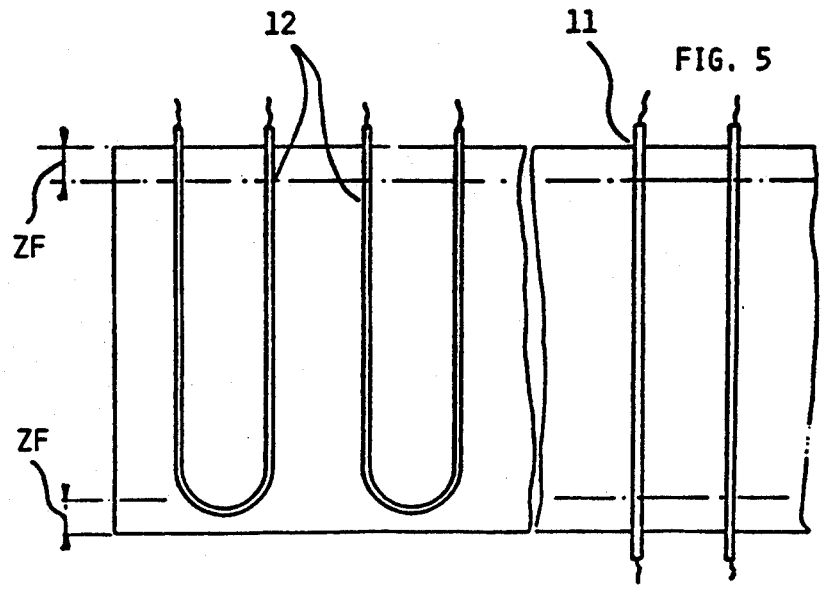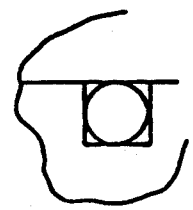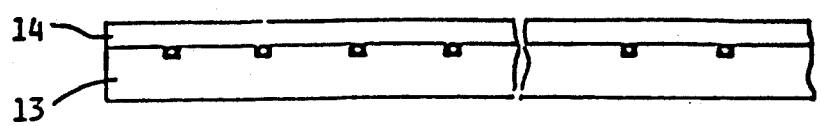

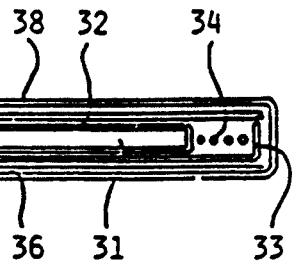
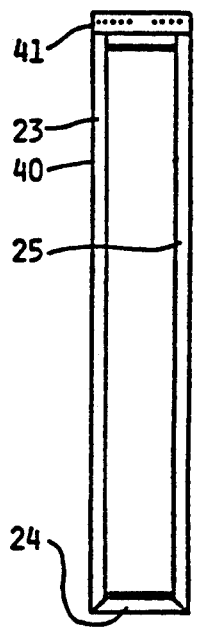
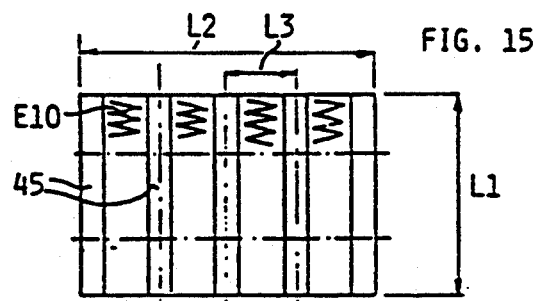
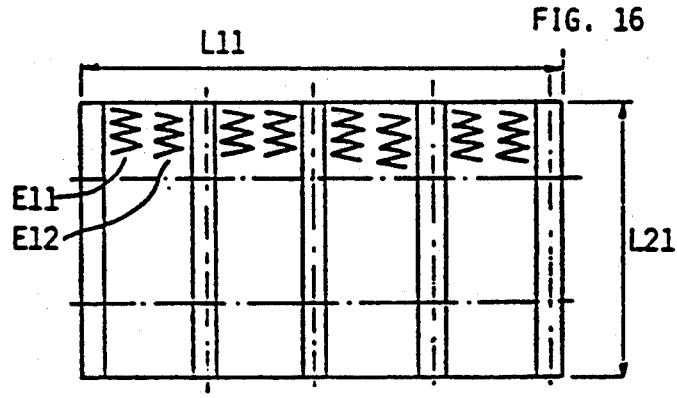
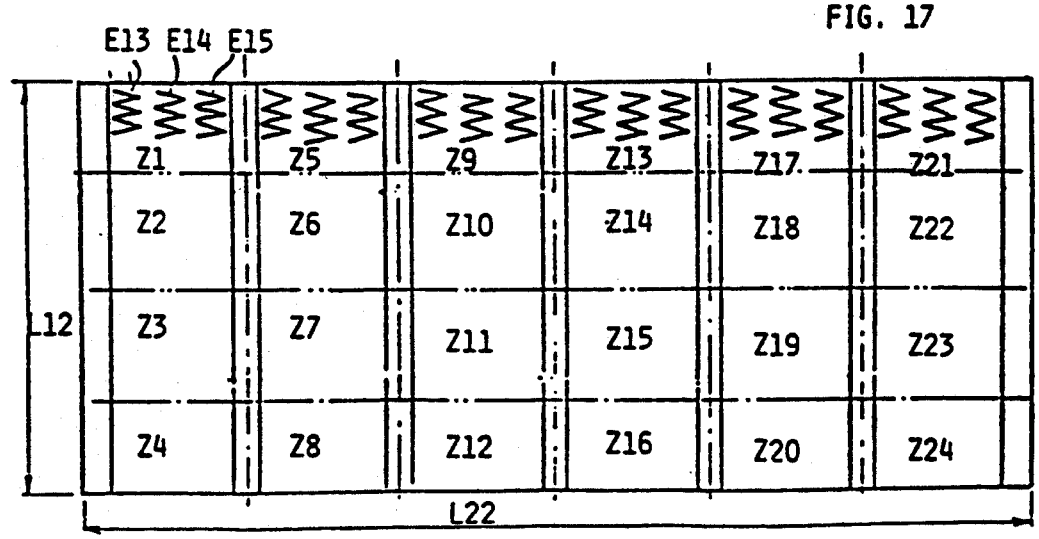

REGULATED TEMPERATURE RISE IN STEPS — POLYMERIZATION — REGULATED COOLING

ZONE-REGULATED HIGH-TEMPERATURE ELECTRIC-HEATING SYSTEM FOR THE MANUFACTURE OF PRODUCTS MADE FROM COMPOSITE MATERIALS

The invention relates to high temperature electrical heater equipment for mounting on a rigid mechanical support, in particular the table or frame of a press for manufacturing products from plastic material and from composite materials, the equipment being of the type comprising:

a heat-distribution plate at a distance from said mechanical support;

thermal insulation means provided against said mechanical support and on the lateral margins of said equipment;

electrical heater means and cooling means disposed between said heat-distribution plate and said thermal insulation means; and temperature regulation means for maintaining a uniform temperature over the entire area of said temperature distribution plate as a function of the manufacturing program.

Hot plates are already known using various different heating techniques such as steam, heat-conveying fluids, and electrical heater resistance elements.

Such hot plates are not suitable for adequately meeting the conditions specific to manufacturing composite material products, in particular local temperature regulation and accuracy in production tooling and molds.

Such a hot plate generally comprises a single block of steel perforated in various ways in order to allow a heat-conveying fluid to flow (e.g. oil flowing along a sinuous path or coil, or steam flowing through a "comb" of parallel paths). These dispositions limit the maximum size of such a plate to the maximum capacity of a drilling machine. Such hot plates may be fitted with cylindrical electrical heater resistances in the form of cartridge elements having a maximum length of 1 meter or placed end-to-end in facing pairs in order to obtain a maximum plate width of 2 meters. It is also possible to use rectilinear or circular metal-clad electrical resistance elements. These are difficult to extract. When extraction is necessary, it cannot be performed quickly and, in any case, such elements give rise to 5 mm to 60 mm wide cold zones at the margins of the plate whose effective size is thus reduced. Since these resistance elements are cylindrical in shape and since they are inserted in square-section holes, heat is poorly conducted because of the presence of air and because of the small contact area.

Use is also made of conventionally manufactured flat metal-clad resistances in the form of single heater elements offering a uniformly-distributed electrical load having a maximum length of 1.5 meters (m), which elements likewise suffer from the drawback of presenting cold end zones. For the purpose of partially compensating the heat losses at the margin of the plate, the electrical load may be concentrated at the ends. These resistance elements are defined and powered on the basis of theoretical calculations. The corresponding hot plates do not provide adequate heating accuracy where it is required, and as a result there are local anomalies in the manufacture of composite material products which may be prejudicial to their strength. In addition, the time required to manufacture such hot plates, and the time required for making products are both long. They do not make it possible to obtain the thermal and mechanical flexibility required particularly from a dimensional point of view, nor do they make it possible to obtain desirable energy efficiency, nor the speed of manufacture nor the temperature accuracies needed for uniform polymerization of composite structures which suffer from a high reject rate. In addition, the investment required is large compared with the unsatisfactory results obtained.

The U.S. Pat. No. 4,659,304 described heater equipment of the type mentioned above in which the heater means are constituted by resistances received in open grooves in one face of a metal hot plate. Patent WO-A-8,706,876 described heater equipment in which the metal hot plate likewise includes grooves for receiving electrical resistances, which grooves alternate with grooves provided for passing a cooling fluid. These heater equipments require special machining of the hot plate, thereby increasing the cost price of the equipment and preventing any subsequent alteration in the structure of the equipment.

Proposals have also been made to notionally subdivide the heat-distribution plate into a plurality of heating zones and to regulate the temperature in each heating zone as a function of the temperature of a privileged zone. DE-A-3,032,422 in particular describes such a disposition. However, such dispositions are inadequate in heater equipment for manufacturing composite material products and the like which require accurate temperature variations as a function of time as defined in an exacting specification, with a high reject rate being the penalty for failure to comply.

The object of the present invention is to provide heater equipment to the type mentioned which mitigates these drawbacks, which is low in cost and easily modified, and which makes it possible to obtain a perfectly uniform temperature over the entire area of the heat-distribution plate during an entire manufacturing cycle. This uniformity must be obtained during periods at constant temperature and also during rises in temperature.

According to the invention, this object is achieved by the fact that:

a) the said electrical heater means and the said cooling means are disposed in independent layers between said thermal insulation means and said heat-distribution plate;

b) the electrical heater means comprise a heater submodule situated adjacent to said heat-distribution plate and a heat return plate fixed to said heater submodule on the opposite side to said heat-distribution plate;

c) the heater submodule includes a plurality of flat and solid metal-clad heater elements disposed across the width of the said heat-distribution plate and spaced apart by spacer blocks;

d) each heater element includes at least three electrical resistances which are separate from one another and distributed in the lengthwise direction of the element;

e) the heater elements are distributed along the length of said heat-distribution plate in at least three zones, thereby defining at least nine different juxtaposed and joining heater zones by virtue of the electrical resistances being distributed across the width of said plate;

f) the heat-distribution plate includes a temperature sensor in each heater zone; and g) the electrical resistances in each heater zone are electrically powered independently from the electrical resistances in the other heater zones via electronic power feed means for each zone, and as a function of predetermined references for each heater zone co-operating with said temperature sensors, said power feed means for each zone being regulated by a PID regulator.

Advantageously, the cooling means includes:

a cooling module having a plurality of independent cooling circuits connected in parallel and spaced apart by spacer blocks, said cooling circuits being servo-controlled by electrically controlled valves governed by an electronic control circuit; and a second heat return plate fixed to the cooling module on the side opposite to said heat-distribution plate.

If priority is given to cooling, the cooling means are interposed between the heat-distribution plate and the electrical heater means.

On the contrary, if priority is given to heating, the electrical heater means for interposed between the heat distribution plate and the cooling means.

By virtue of this disposition, the heater elements are spaced apart merely by means of spacer blocks. There is no longer any need to machine grooves in the hot plates. Depending on the use to which the heater equipment is put, it is possible to interchange the position of the heating module and of the cooling means. Since the heater elements are flat and metal-clad, a large heat exchange area is obtained with the heat-distribution plate. In order to modify the area of the heating zones, it suffices merely to replace old heater elements by new heater elements of different widths or having a different distribution of resistances, or to alter the distribution in zones of the elements lengthwise relative to the heat-distribution plate.

The peripheral heater zones are preferably different in area from the central heater zones.

Advantageously, some zones, at the corners and at the margins of the equipment, are associated with electrical resistances of different powers.

Advantageously, the electronic power feed means for each zone comprise, for each heater zone, an electronic power modulating card fitted with a manually-adjustable potentiometer for setting electrical power.

Advantageously, it further includes a computer provided with software suitable for regulating the electronic power feed means for zone as a function of predetermined references for each heater zone.

In order to improve temperature regulation, each electrical resistance is fitted with its own temperature measuring sensor connected to the computer.

In addition to the above-mentioned constructional advantages, it should be observed that adjusting the power in heating zone units makes it possible to guarantee temperature uniformity over the entire area of the heat-distribution plate or as a function of heat losses. It also makes it possible to adjust this uniformity as a function of the utilization to which the machine is put, either operating empty and without tooling, e.g. when manufacturing plates, or else working loaded with different designs of tooling. The electrical power adjustment performed by the electronic cards or by the software serves to obtain temperature uniformity in the mold depending on the external radiation generated by the height and the shape of the part to be obtained. Such temperature adjustment is variable as a function of temperature reference points required for working the materials.

Other advantages provided by equipment of the invention include the following:

an area which can be adjusted to any utilization without dimensional limitation;

a considerably improved production yield of manufactured parts;

with the reject rate of parts made of composite materials dropping to zero, the fact that they are cured very uniformly makes it possible to obtain parts that are of very high quality;

the ratio of total hot plate area divided by heating area is large;

good heat exchange is obtained by maximizing the area of proper contact;

each technical component, i.e. metal-clad heater elements or cooling circuit, is rapidly interchangeable;

it is possible to construct large working areas and even very large areas by adding together the areas of standardized heater modules;

assembly and after-sales service maintenance actions are facilitated;

the planeness of the heating surface can be adjusted while it is hot or while it is cold by virtue of the rapid fixing on frames or plates of machines or on intermediate boxes;

resistance to mechanical expansion and to thermal shock generated at the beginning of the cooling stage by admitting water into the cooling circuits by virtue of a stack type assembly enabling expansion and contraction to take place laterally, thereby avoiding tension within the module;

easy to adapt to manufacturing processes which are hot, cold, or both hot and cold while giving priority to heating or to cooling;

multizone PID electronic temperature regulation can be adapted to the technical requirements of the assembly;

temperature can be raised quickly to peak values of 500° C., and both natural and exceptional heat losses during operation can be compensated;

it is possible to use heater elements mounted on ceramic supports in order to achieve regulated surface temperatures of 800° C. to 900° C. instead of the maximum of 500° C. possible with heater elements in mica supports;

it is possible to provide tooling including equipment elements for heating the parts to be manufactured very closely, in particular when the tooling is at a considerable height above the heat-distribution plate;

the heater modules may be fitted to multi-stage presses having intermediate plates;

the equipment can be adapted to all types of application for making technical products in plastic, using composites in general, etc., i.e. using any material that requires highly reliable temperature curves in order to obtain a mechanical assembly corresponding to accurate specifications for manufacturing specific parts; and the equipment can be adapted to all types of machines;

a) by compression on pneumatic or hydraulic presses requiring one or more superposed modules to be fitted;

b) by contact on a continuous or paying-out tunnel and oven;

c) on hot plates of all sizes, with special center connections; and d) on all special machines.

The invention is described in detail in the following description made with reference to the accompanying drawings given by way of non-limiting example, and in which:

FIGS. 1 to 9 show examples of prior art type of press plate heater means;

FIG. 12 is a cross-section through an example of a heater element of the invention;

FIG. 13 shows an example of a metal-clad heater element of the invention seen from above;

FIGS. 15 to 18 are examples showing how modules are subdivided into zones depending on their sizes, and examples showing different numbers of heater elements per zone;

Figure 1:
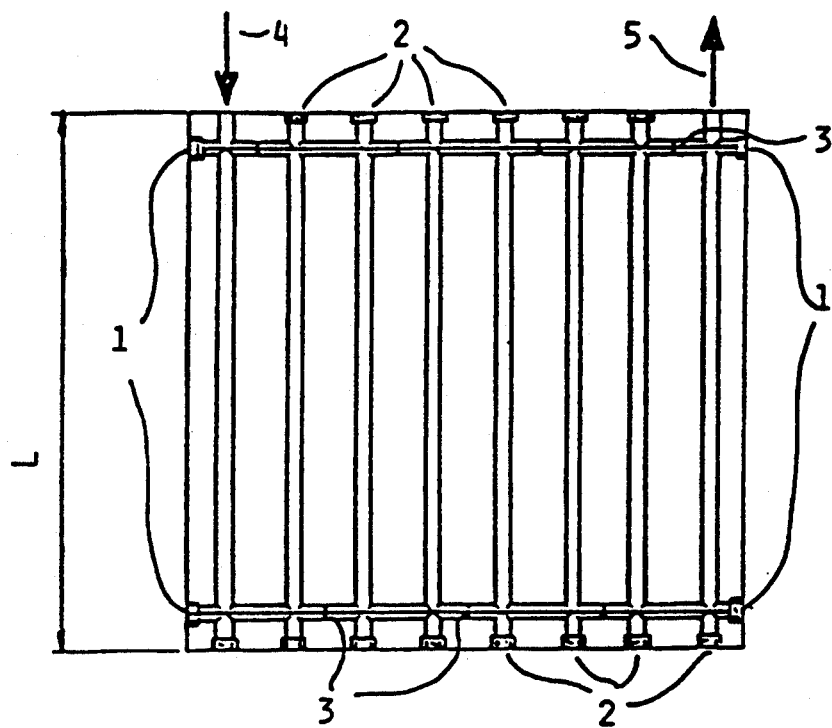

FIG. 1 shows an example of a prior art hot plate drilled through its bulk in order to allow a heat-conveying fluid to follow a sinuous path by installing plugs 1 and 2 and metal pellets in the drilled holes so as to constitute a single sinuous path of "coil" having an inlet 4 and an outlet 5.

Figure 2:
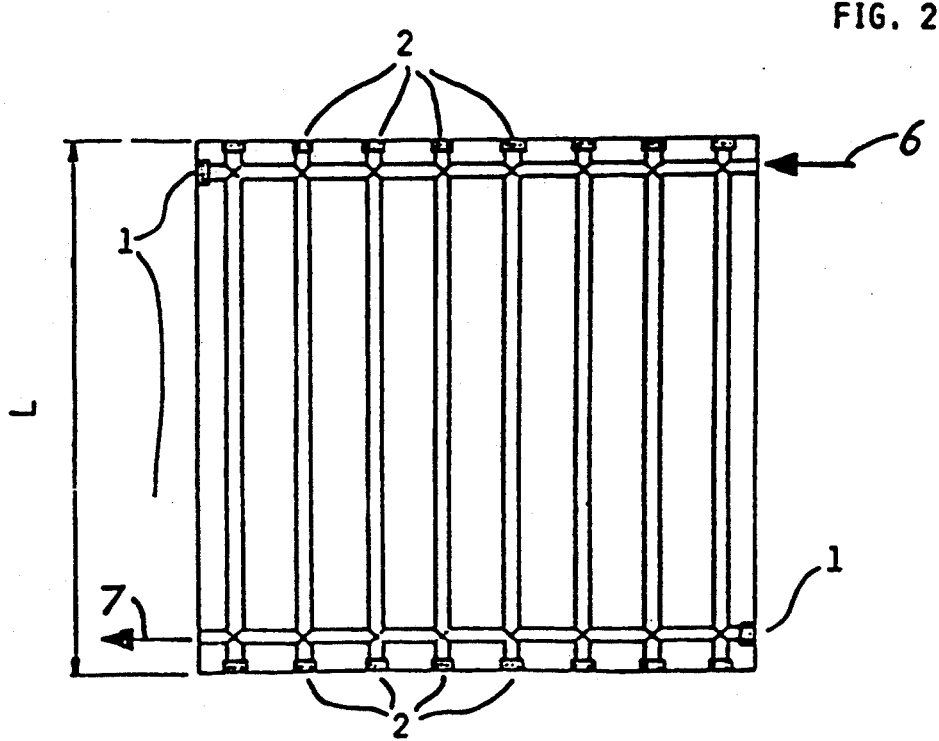

FIG. 2 shows an example of a prior art hot plate for a flow of a heat-conveying fluid such as steam which follows a "comb" of parallel paths between an inlet 6 and a return 7. Like the preceding plate, the length L is limited by the capacity of the drilling machine.

FIGS. 3 and 4 show an example of a prior art hot plate using cylindrical cartridge type electrical resistance elements 9 occupying the entire width of the plate, up to a maximum width of 1 meter (m), or alternatively mounted in pairs 9, 10 mounted facing one another end-to-end, thereby making it possible to have a total width of 2 meters.

FIGS. 5 and 6 show another example of a prior art hot plate using rectilinear metal-clad electrical resistor elements 11 or hairpin elements 12, installed in a milled region in a support plate 13 and covered by a plate 14. The heat exchange area between the plate and each resistor element is limited to 4 generator lines (FIG. 7), and the presence of air gives rise to poor heat conduction. With such elements, cold zones ZF are observed over a width of 50 mm to 60 mm along the margins of the plate at the ends of the heater elements.

Figure 8:
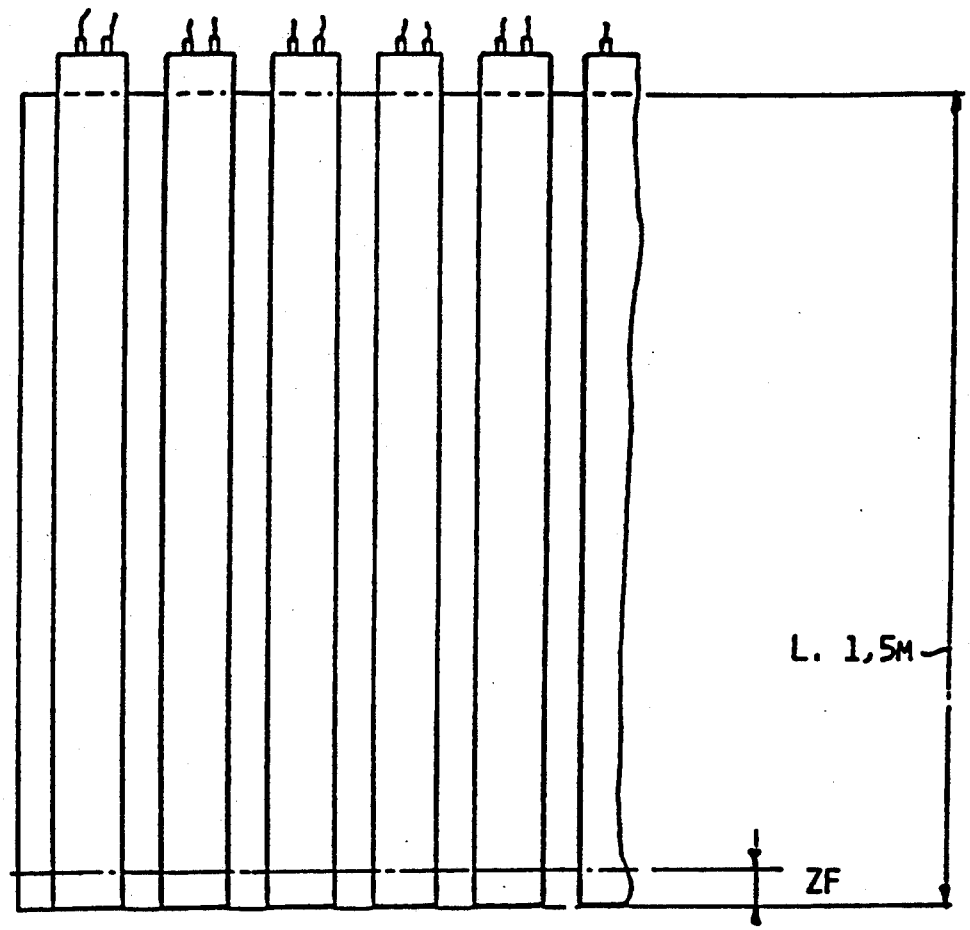
Figure 9:
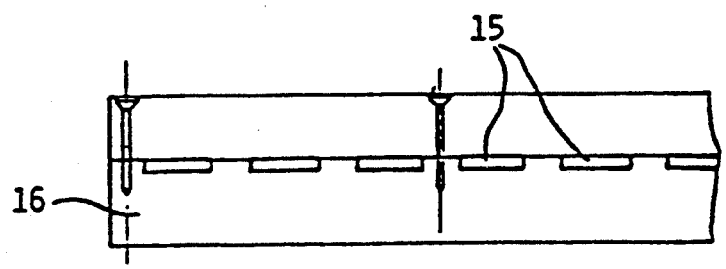

FIGS 8 and 9 show another example of a prior art hot plate using flat metal-clad resistance elements with each element extending across the entire width of the plate. Each element is received in the milled grove of a mechanical support 16. The plate may be as much as 1.5 m wide. Efficiency is already improved with this type of resistance element, since the heat exchange area is greatly improved compared with cartridge elements. In addition, flat heater elements are available with electrical load concentrated at the end in order to compensate for extra heat losses from the margins of the plate. All of these resistance elements are designed on the basis of theoretical calculations and they are powered together at constant power. In the event of a design error, the elements must be changed since there is no way of adjusting temperature.

Figure 10:
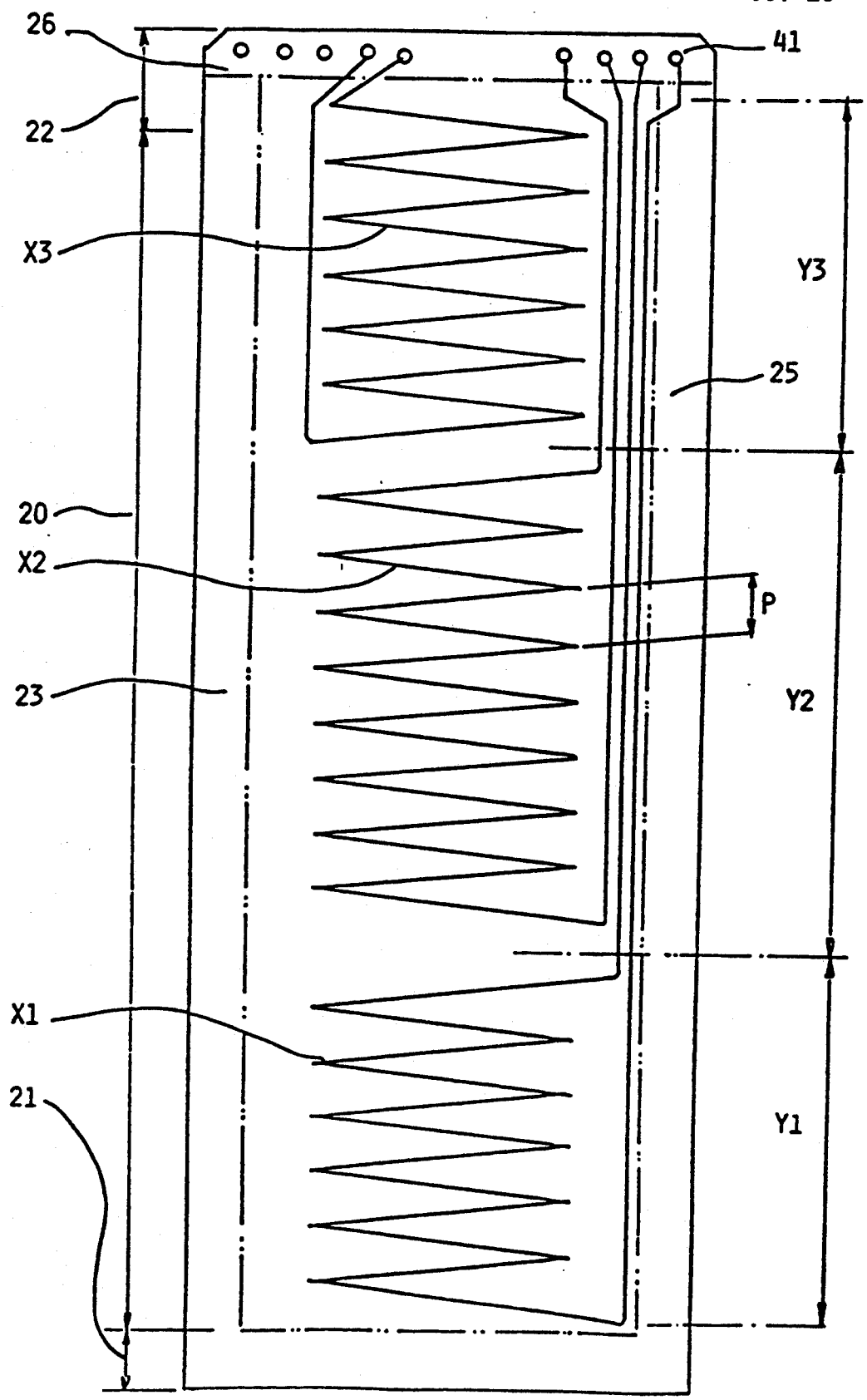
FIG. 10 shows an example of a metal-clad heater element of the invention, including three separate loads.

FIG. 10 is a diagram of a flat metal-clad heater element of the invention including a minimum of 3 electrical resistances X1, X2, and X3 of respective lengths Y1, Y2 and Y3 and of constant or variable pitch P which is adjusted to match the required power. The resistances are made, for example, of nickel steel tape having a thickness E and a width 1 depending on the required power. A useful length 20 is shown with an inactive end 21 or length 10 mm and another end 22 which is about 30 mm long where the conductors come out. Dot-dashed lines 23, 24, 25, and 26 show folding in the external metal cladding which is shown in section in FIG. 12. The tape constituting the resistances is wound on a mica support.

Figure 11:
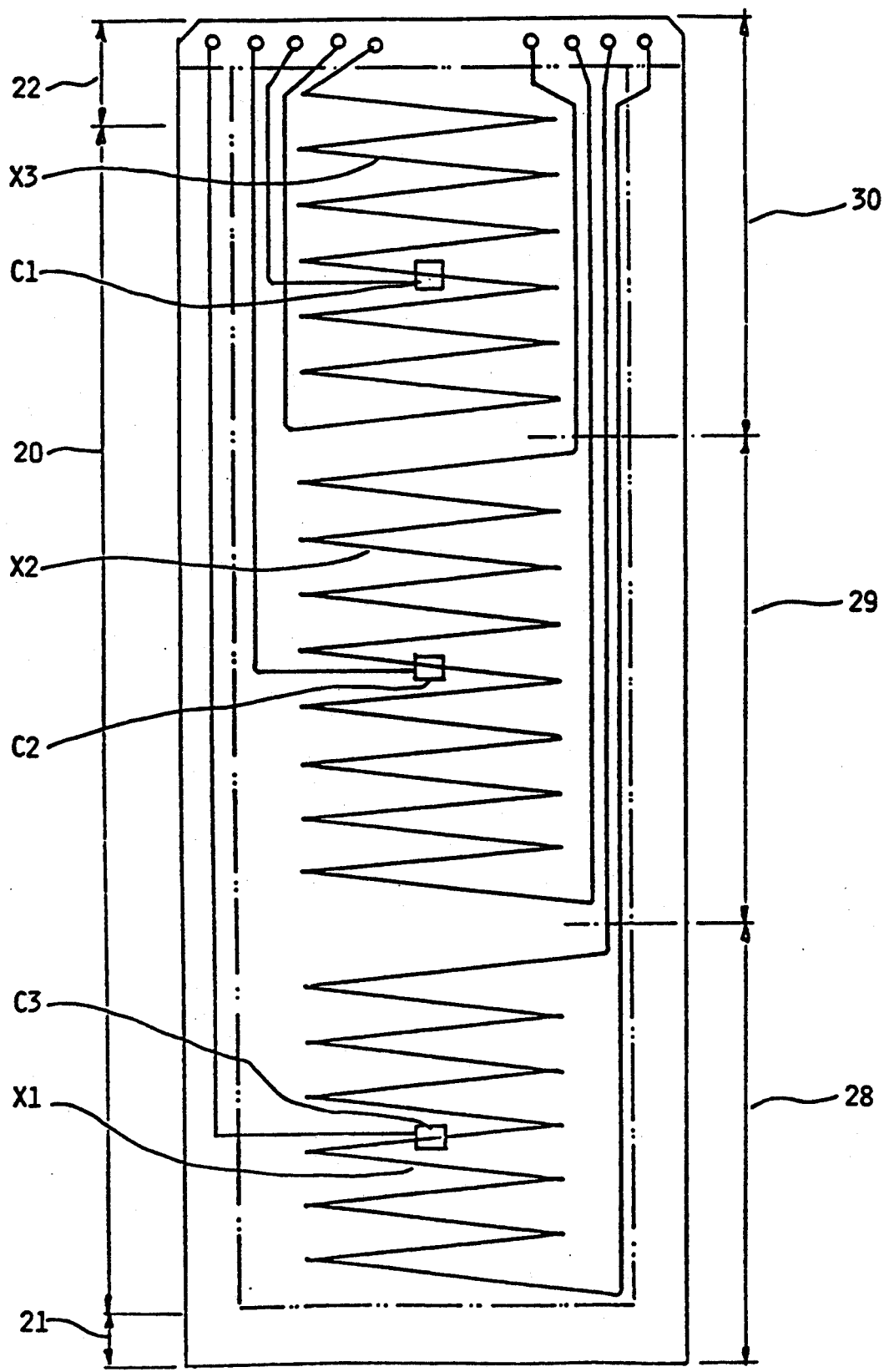
FIG. 11 shows an example of a metal-clad heater element identical to that of FIG. 10, provided with integrated temperature sensors.

FIG. 11 is identical to FIG. 10 except in that an integrated temperature measuring sensor C1, C2, and C3, e.g. of the thermocouple (TC) type has been added to the middle of each resistance X1, X2, and X3 so as to minimize the effects of measurement distortions. The width 27 of each heater element may be about 60 mm as a minimum to about 200 mm as a maximum. The length of each metal-clad heater element is divided into at least 3 portions: a leading end portion 28, at least one central portion 29, and a rear end portion 30, with the length and the power of each portion varying as a function of requirements.

FIG. 12 is a section through a flat metal-clad heater element of the invention. It shows:

a mica support 31 for utilization up to 500° C., or a ceramic support for use above 500° C. to 900° C. for applications specific to certain composite materials;

a coiled resistance 32;

mica insulation 33 protecting the conductors 34; and metal-cladding made of aluminum-covered steel sheet 35 which is folded and crimped on a closure sheet 36 onto which a thickness-compensating sheet 37 is welded, with the thickness-compensating sheet always being on the underside while the active face 38 is always on the same side as the heating surface of the module.

FIG. 13 is a smaller scale drawing of a heater element 40 of the invention seen from the outside, with the power supply and measurement conductors being brought out via terminals constituting an end terminal strip 41 that facilitates interchangeability.

Figure 14A:
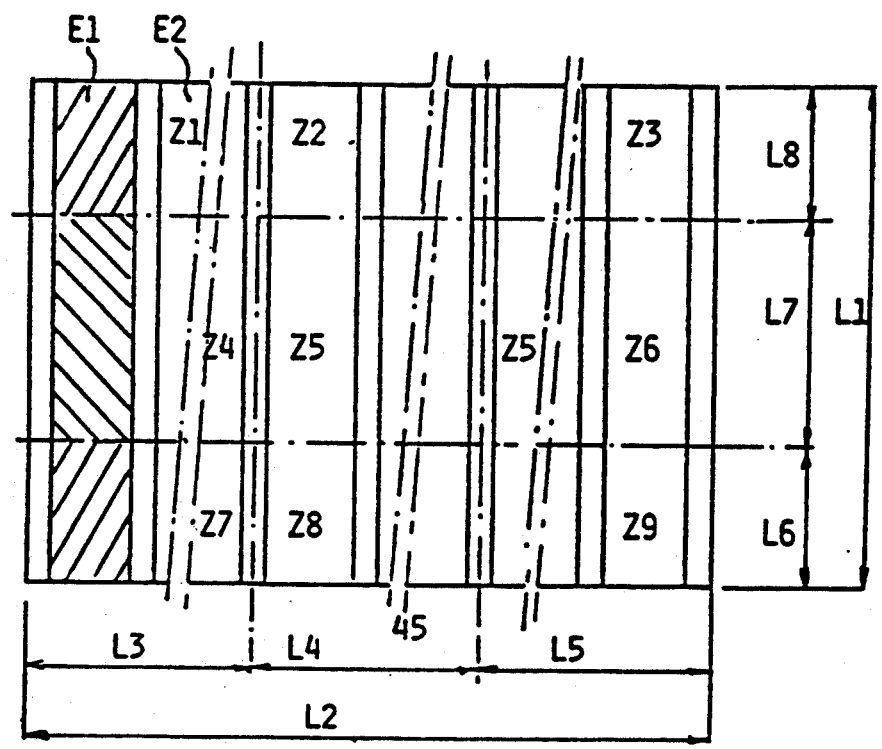
FIGS. 14A and 14B show an example of hot heater element and distributed within a single zone of a module.

FIG. 14A shows a diagrammatic example of a heater equipment or module of width L1 and of length L2 in which the heater elements are spaced apart in the length direction of the equipment into at least three zones having respective widths L3, L4, and L5, and which together with the three heater element portions of lengths L6, L7, and L8 enable the heater plates to be notionally split up into at least nine juxtaposed and touching heater zones Z1 and Z9.

Figure 14B:
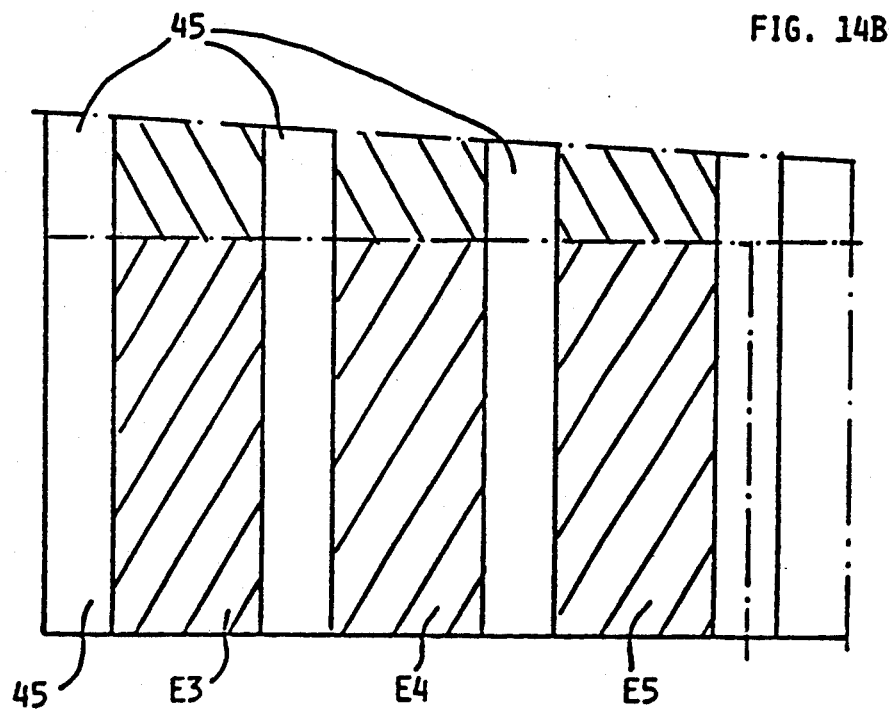

The zones may be constituted by varying numbers of heater elements. Each zone may include two heater elements E1 and E2 (FIG. 14A) or three heater elements E3, E4, and E5. FIG. 14B shows a zone comprising three heater elements separated by steel spacer blocks 45. FIG. 15 to 17 show examples of multizone heater modules of different dimensions including either a single heater element E10 of length L1 per zone of width L3 (FIG. 15), or two heater elements E11, E12 per zone over the entire length L11 of the module which is also split into 12 zones (FIG. 16), or else three heater elements E13, E14, and E15 per zone, with the length of each heater element being equal to the width L12 and having its terminal strip 41 at one of the sides of the module of length L22 which is divided into 24 zones in all: Z1 to Z24 (FIG. 17).

Figure 18:
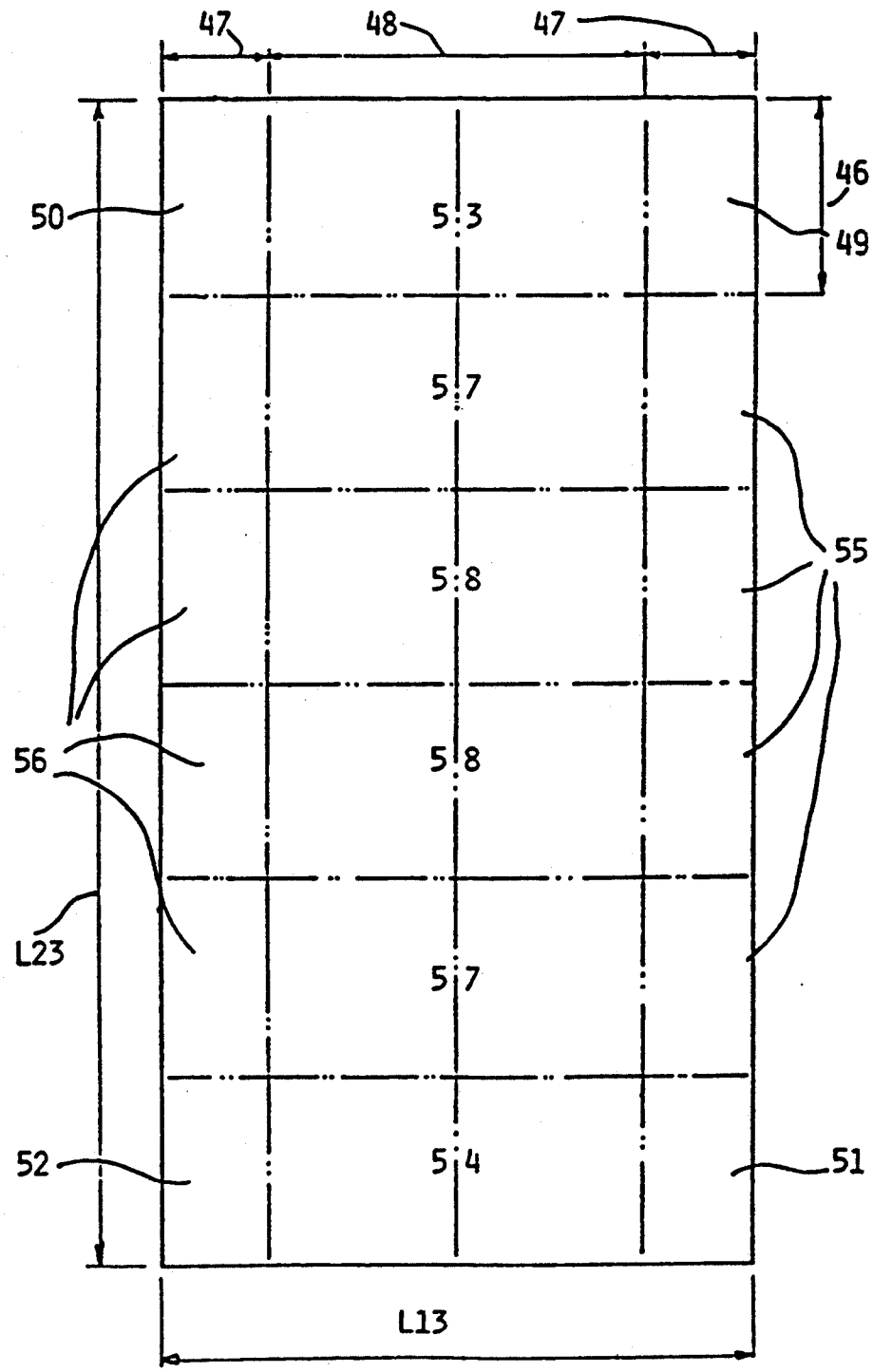

FIG. 18 shows a module of length L23 and width L13 divided into 24 independent heater zones. There may be up to 6 heater elements across the widths of zones 46 with the resistances in each zone being powered in series or in parallel, and it is advantageous to avoid installing too many resistances per zone since regulation then becomes difficult and expensive. The lengths 47 of the resistances per heater element are equal at the ends and are longer in the middle 48. For the same power per unit area to be heated, the corners loose about 30% via heat losses, and the margins 53, 54, 55, and 56 loose at least 10% to 20%, with the right and left center portions 57 also loosing a little temperature relative to the middle 58. By electrically powering each zone separately and by regulating it continuously, it is possible to provide continuous compensation for these heat losses so as to ensure uniform temperature to within about half a degree C. over the entire area of the module.

Figure 19:
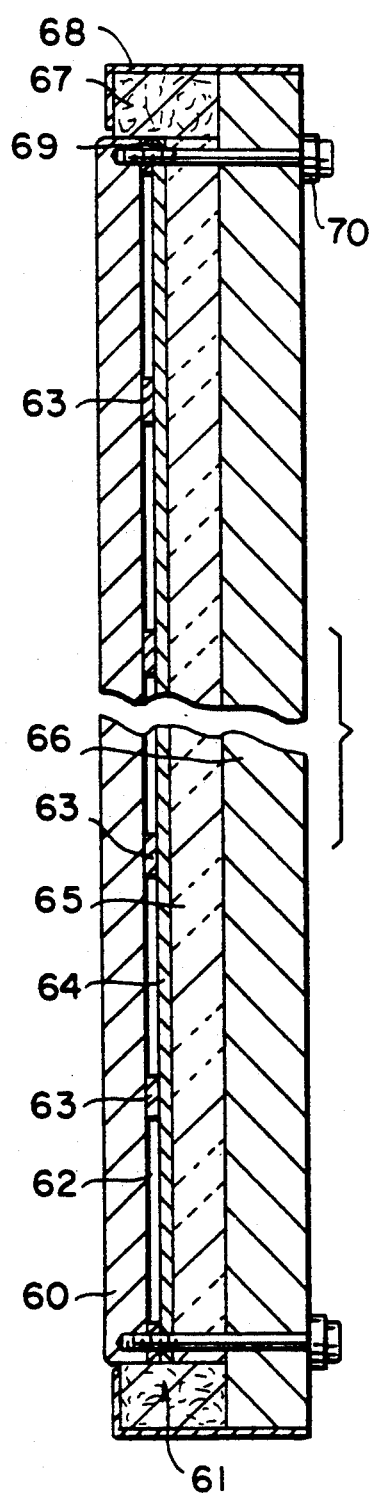
FIG. 19 shows an example of a heater module of the invention.

FIG. 19 shows an example of a heater module of the invention and comprising:

a heat-distribution plate 60 whose area is equal to that of the module, whose thickness varies, made of steel which is compatible in thermal resistance and mechanical strength or of any other material having similarly compatible characteristics;

a heater submodule 61 comprising, in each zone, at least one metal-clad heater element 62 whose length is equal to the width or half the width of the module, spaced apart by spacer blocks 63 of fixed width, and of accurate thickness which is slightly less than the thickness of the heater element 61 so as to compress it on assembly, thereby improving heat transfer by contact;

a heat return plate 64 for returning heat via the block 63 and acting as a thermal bridge, having the same area as the module and having a thickness which is a function of the power to be dissipated;

an insulating plate 65 disposed beneath the return plate 64 and of thickness that needs to be determined by operating and maximum temperatures;

a mechanical support 66 which may be constituted by each of the press plates in a single or multiple press (a press having intermediate plates);

lateral insulation 67 around the module comprising bulk fibers in particular in the electrical and fluid connection compartments for providing packing between all of the electrical connections and pipework, and protected by casing 68 fixed on the mechanical support 66, making it possible for the plate to expand at its maximum temperature while avoiding heat bridges; the casing is designed in such a manner as to obtain an outside temperature in compliance with applicable safety regulations; and high strength steel fixing screws 69 with thermally insulating washers 70 limiting the heat bridge with the mechanical support.

Such screws make it possible to adjust the planeness of the module when hot or when cold depending on the nature of the heat-distribution plates, e.g. whether they are made of aluminum or steel, and as a function of the design of the machine or its support and the industrial utilization of the machine, and in some cases the heater modules may operate on a permanent heating basis. If heater elements and/or cooling circuits need to be removed and exchanged, then it suffices merely to undo the screws 69, as can be seen in FIG. 20.

Figure 20:
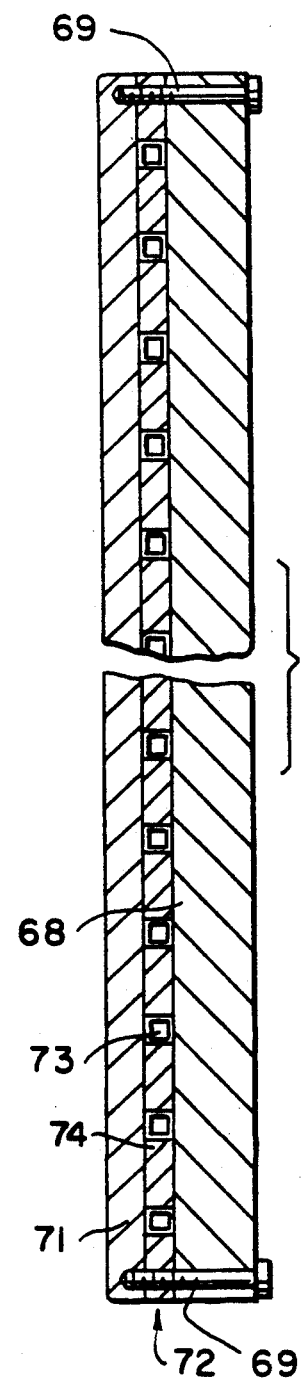
FIG. 20 shows an example of a cooling module of the invention.

FIG. 20 shows an example of a cooling module of the invention and constitutes:

by a heat-distribution plate 71 whose areas is the same as that of the module;

a cooling submodule 72 constituted by a plurality of independent cooling circuits connected in parallel, made of square-section tube 73 whose dimensions depend of the application and whose width is determined as a function of the forces exerted and of the sizes commonly available on the market, with these tubes being spaced apart by spacer blocks 74 having the same width as the tubes; each of the independent circuits may be fed:

1) separately by means of a direct feed and a direct outlet;

2) via a single step loop, so that the outlet is disposed at the same side as the feed in order to enable the manifolds to be close together; or 3) in loops of 2 to n steps thus constituting sinuous paths of lengths adapted, depending on the number of elements and on the dimensions of the module, so as to coincide with the desired temperature distribution between the inlet and outlet temperatures of the water and the duration of the cooling which is to be obtained, thereby determining the number of steps; and a mechanical support 68 which may be the corresponding plate of the press.

Figure 21:
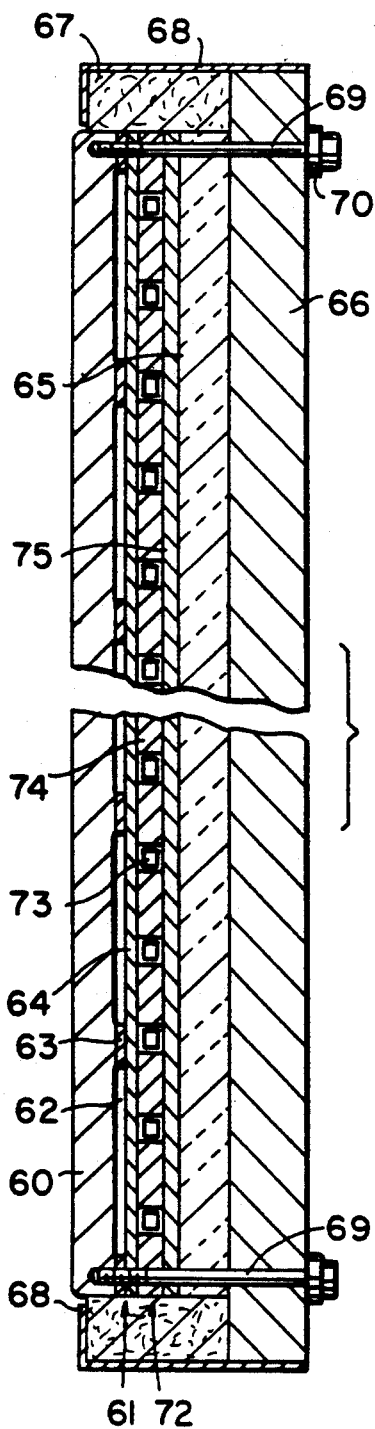
FIG. 21 shows an example of a combined heater and cooling module with priority given to heating.

FIG. 21 shows an example of a combined heater and cooling module of the invention giving priority to heating, in which the cooling submodule 72 is disposed beneath the heat return plate 64 of the heater submodule 61. The same reference numerals have been reused for parts that are identical. A heat return plate 75 is disposed beneath the cooling submodule together with a thermally insulating plate 65, with the combined module made up in this way being fixed by screws 69 on a mechanical support 66 which may be a plate of a press. The same reference numerals have been used as in FIGS. 19 and 20.

Figure 22:
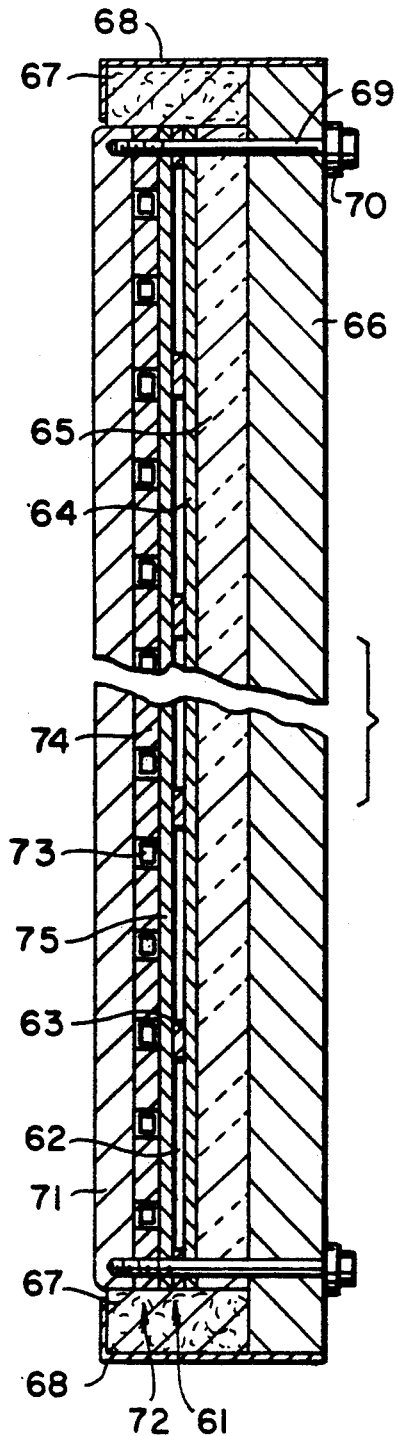
FIG. 22 shows an example of a combined heater and cooling module with priority given to cooling.

FIG. 22 shows a combined heating and cooling module of the invention integrating a heater submodule 61 and a cooling submodule 72 with priority being given to cooling. In this combined module, the position of the cooling submodule is interchanged relative to FIG. 21, with the cooling submodule 72 being above the heating submodule 61.

In FIGS. 19 to 22, it can be seen that implementing modules of the invention requires little work since all of the elements are merely placed or stacked in successive layers and held together by screws that merely pass through simple fixing holes in the plates, thereby allowing the various component parts complete freedom to expand. The spacer blocks 63 and 74 are cut to length from standard commercial flat bars.

Figure 23:
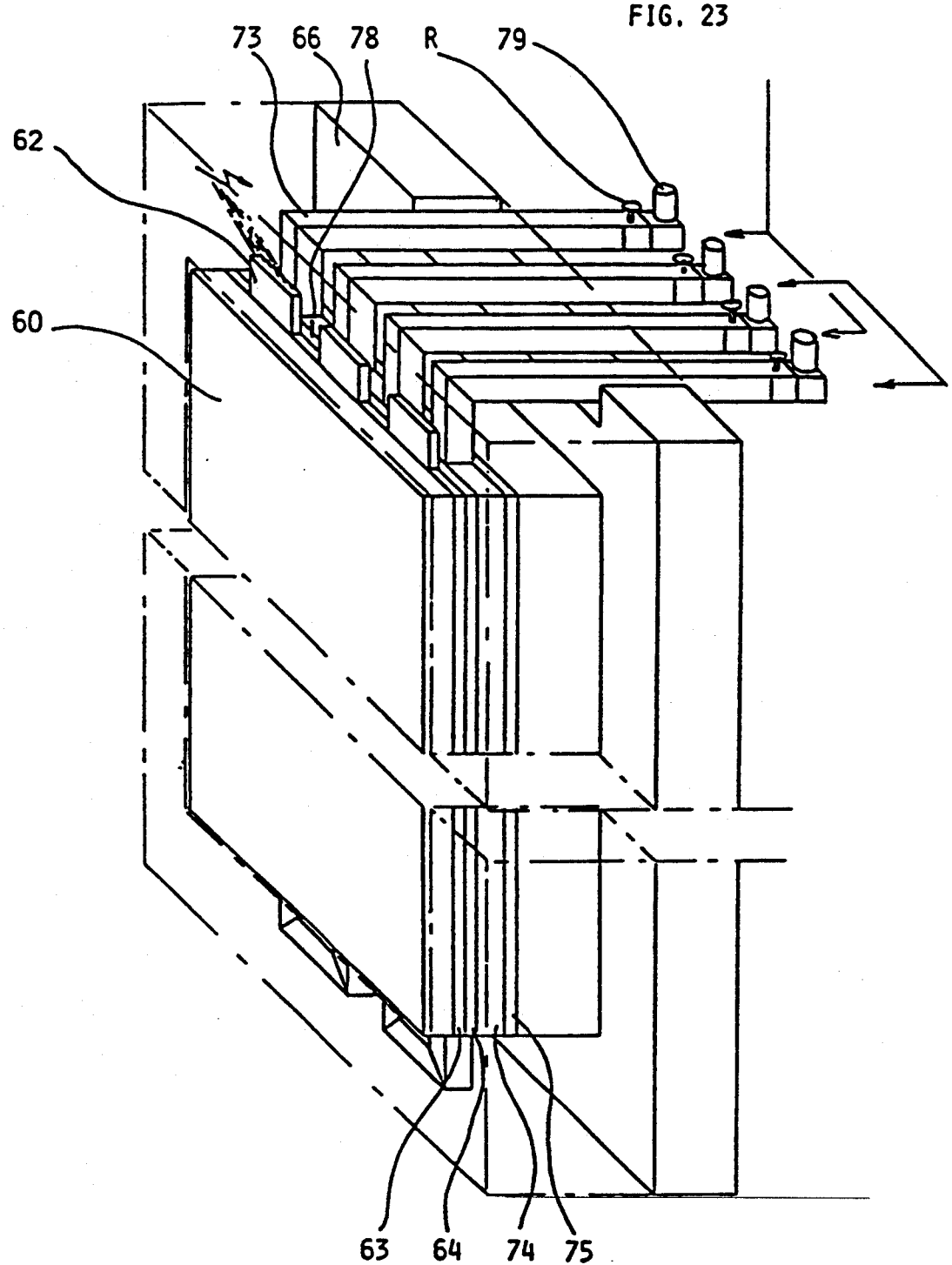
FIG. 23 shows an example of the bottom plate of a press or the like including equipment of the type comprising a combined module with heating priority in accordance with the invention.

FIG. 23 is a perspective view showing an example of a combined module with priority given to heating, and the reference numerals of the preceding figures are used again, showing the disposition of the various layers of the module, the outlets of the heater elements 62 and of the cooling circuit 73 each of which is fitted with a cock R (e.g. a needle valve tap for adjusting flow rate and an electrically controlled valve 79 under electronic cycle control.

Figure 24:
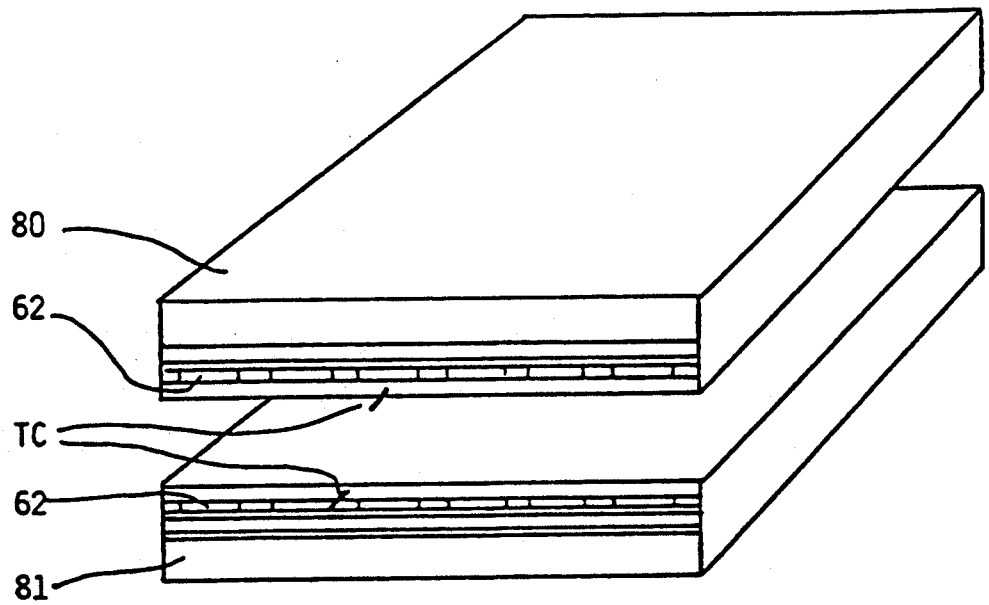
FIG. 24 shows an example of a combined module of the invention mounted on the facing plates of a hydraulic press.

FIG. 24 is a diagram showing an example of press plates 80, 81 each fitted with a combined heater and cooling module and disposed facing each other for manufacturing high performance composition materials.

Figure 25:
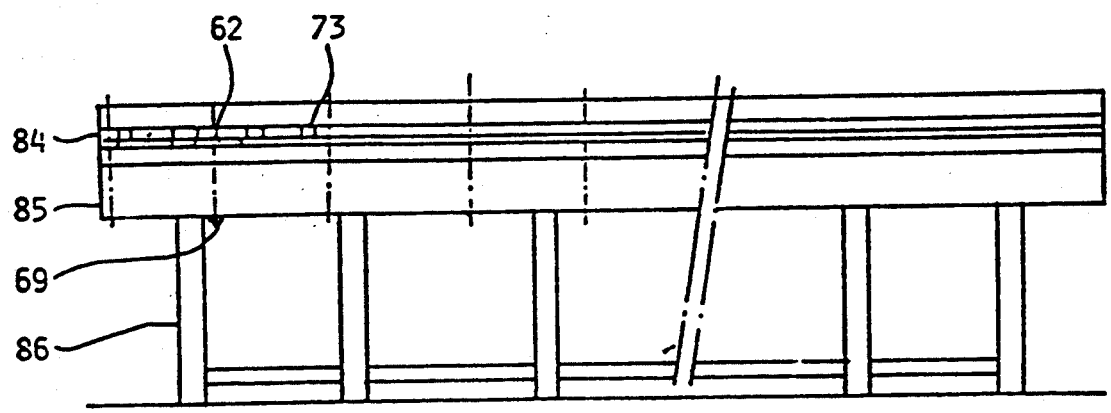
FIG. 25 shows an example of a module mounted on the frame of a hydraulic press.

FIG. 25 is a diagram of a module 84 mounted on the bottom plate 85 of a hydraulic press. The plate is mounted on legs 86 providing reinforcement.

Figure 26:
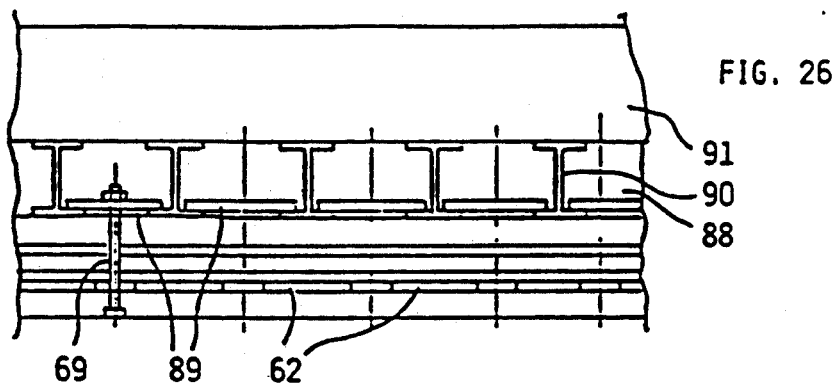
FIG. 26 shows an example of a module of the invention mounted on a pneumatic press.

FIG. 26 shows an example of a module 87 of the invention mounted on the beam 88 of a pneumatic press by means of screws 69 and plates 89 disposed between the bars 90 of the press and constituting a top support member 91.

Figure 27:
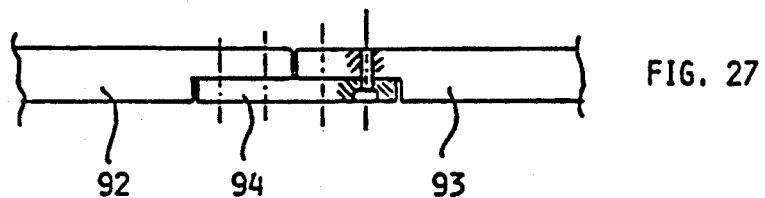
FIG. 27 shows an example of how and heat-distribution plate may be extended for heating large areas.

FIG. 27 shows how heat-distribution plates 92 and 93 are made up of small elements are joined together in order to build up large working areas. The plates 92 and 93 are milled to receive connecting plates 94 which are screwed to each of the heat-distribution plates.

Figure 28:
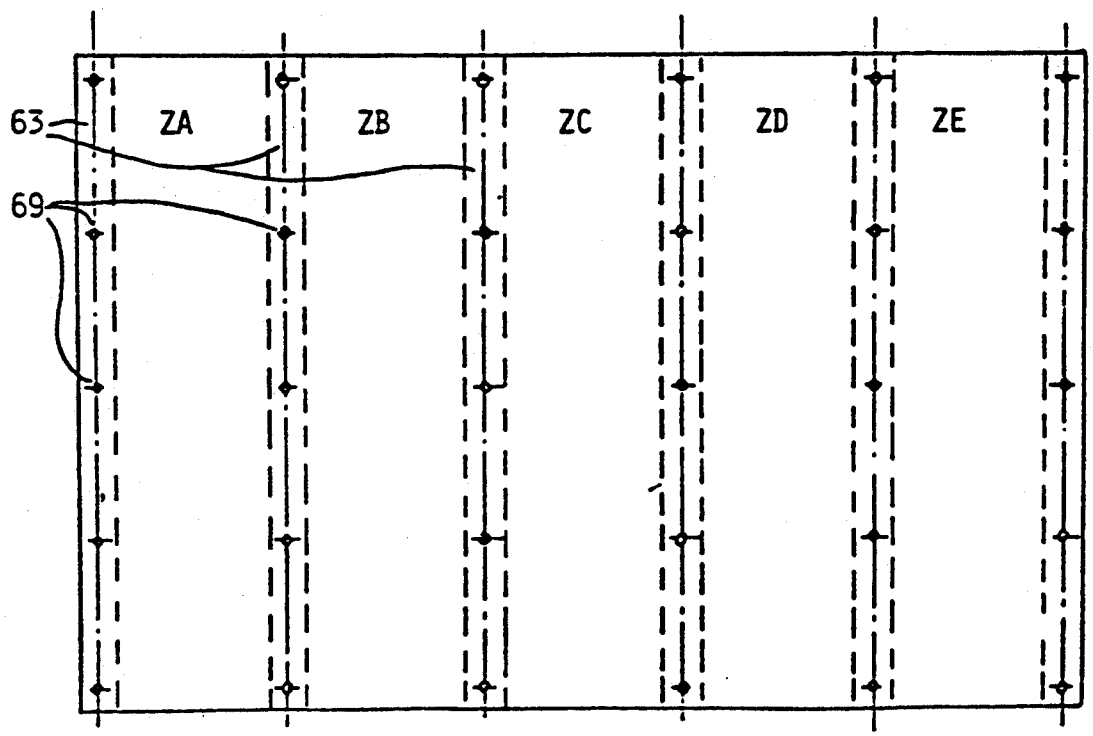
FIG. 28 is a plan view showing an example of how a heater module of the invention may be fixed on a plate of a press.

FIG. 28 shows how the various component layers of a module constituted by zones ZA and ZE delimited by a spacer blocks 63 are fixed together. The fixing screws 69 pass through the blocks 63 as well as some of the blocks 74 of the cooling submodule. The heating surface is made plane while hot or while cold by tightening these screws over the entire area to a greater or a lesser extent, with planeness being monitored by one or more long measuring rulers.

Figure 29:
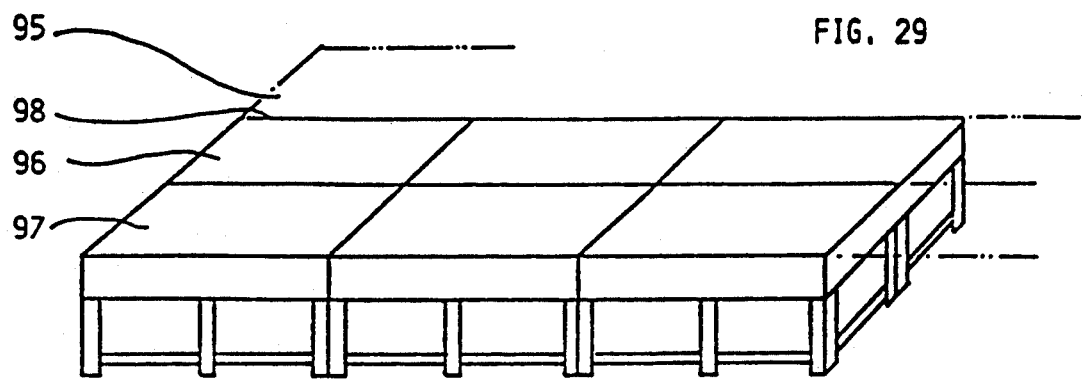
FIG. 29 shows how a very large size heater area may be built up in accordance with the invention.

FIG. 29 is a diagram of a large heating area built up by assembly heater modules of the invention of standardized dimensions, e.g. 3 m × 2 m, i.e. by giving a total of 9 m × 4 m.

This method of proceeding makes it possible to escape from the normal limitations on size since leveling is not a problem. When a row 95 of modules is added, giving three rows 95, 96, and 97, the internal connections at the end 98 and the connections to the cooling circuits are brought out beneath the modules.

Figure 30:
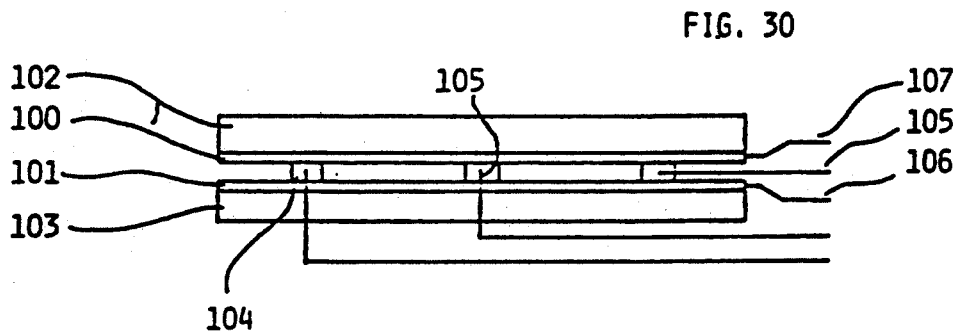
FIGS. 30 and 31 show an example of monitoring and adjusting the uniformity of surface temperature between two modules of the invention disposed facing each other by means of one spacer block per zone.
Figure 31:
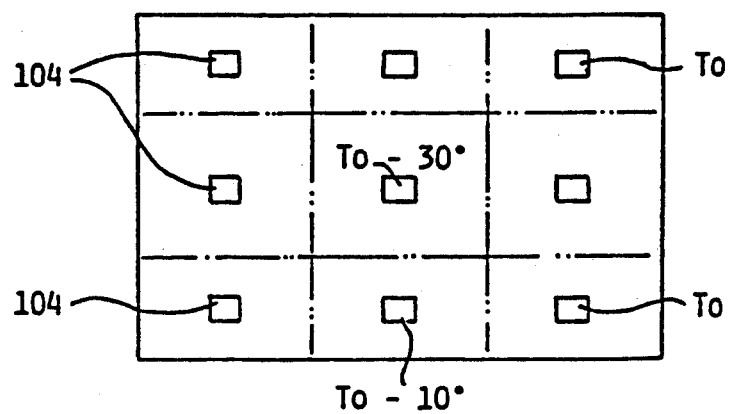

FIGS. 30 and 31 show one way of monitoring and adjusting temperature uniformity over the area of the heat-distribution plates 100 and 101 of the facing top and bottom modules 102 and 103 (e.g. each fixed on one of the plates of a press) by means of spacer blocks 104 whose disposition in the centers of the zones is shown in FIG. 31. Each block 104 is provided with a temperature measuring sensor 105, e.g. a thermocouple TC, cooperating with identical measuring sensors 106 and 107 placed on the plates 101 and 100.

Heat losses from the corners and the margins are measured and they are electronically compensated by distributing power appropriately.

The blocks 104 may be replaced by test pieces of composite material having the same nature as the parts being manufactured, and likewise fitted with respective temperature measuring sensors.

Figure 32:
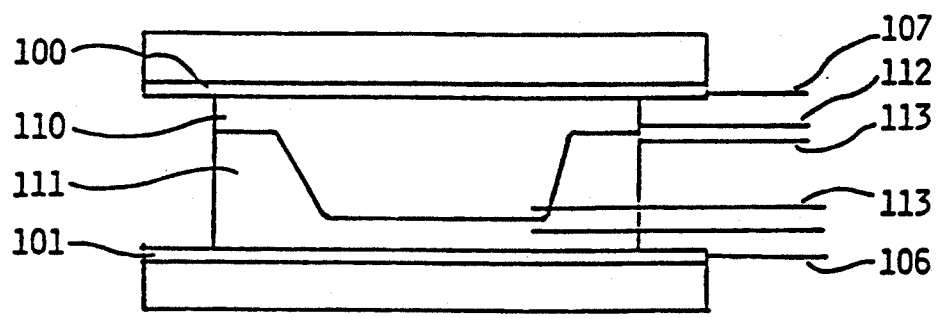
FIG. 32 shows an example of monitoring and adjusting uniformity over each portion of tooling mounted on modules of the invention.

FIG. 32 shows an example of uniform temperature regulation on each of the portions 110 and 111 of a module fixed on the heat-distribution plates 100 and 101 of modules of the invention. A plurality of molds may be installed on the same heating surface. The heat-distribution plates 100 and 101 of the heater modules are fitted with temperature measuring TC sensors 106 and 107 and the top and bottom portions of the mold are likewise fitted with sensors 112 and 113 for temperature regulation by zone over the modules depending on requirements relating, in particular, to heat losses.

Figure 33:
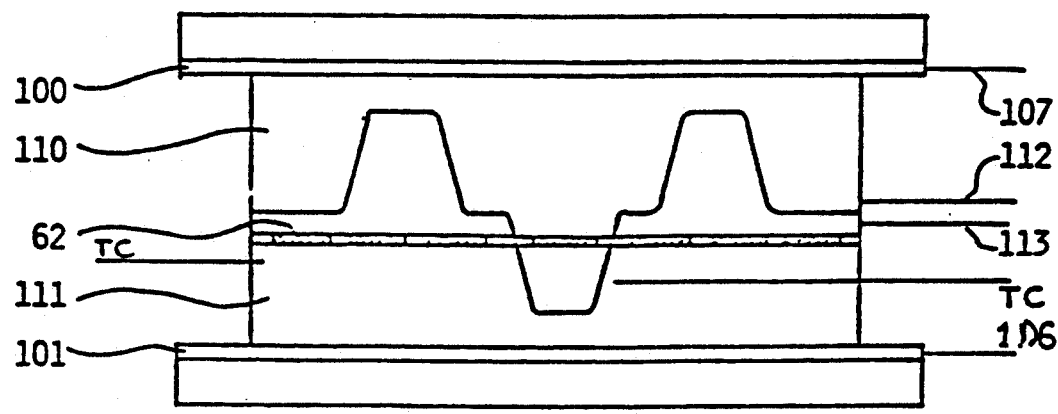
FIG. 33 shows an example of a special module including heater elements and cooling elements within tooling mounted on a module of the invention.

When the molds are relatively tall (as shown in FIG. 33), then the portions furthest from the heater surfaces may include metal-clad heater elements co-operating with said heater surfaces in order to compensate heat losses due to the height of the molds and to the difficulties of providing thermal insulation therefor. These heater elements 62 are mounted in exactly the same way as the modules described with reference to the preceding figures.

For the same reasons, portions of cooling circuit may also be provided directly in the molds. When the shapes of the molds makes this possible, and when the quantities of parts to be manufactured are large, the molds themselves may include the entire heater areas and all of the cooling circuits.

Figure 34:
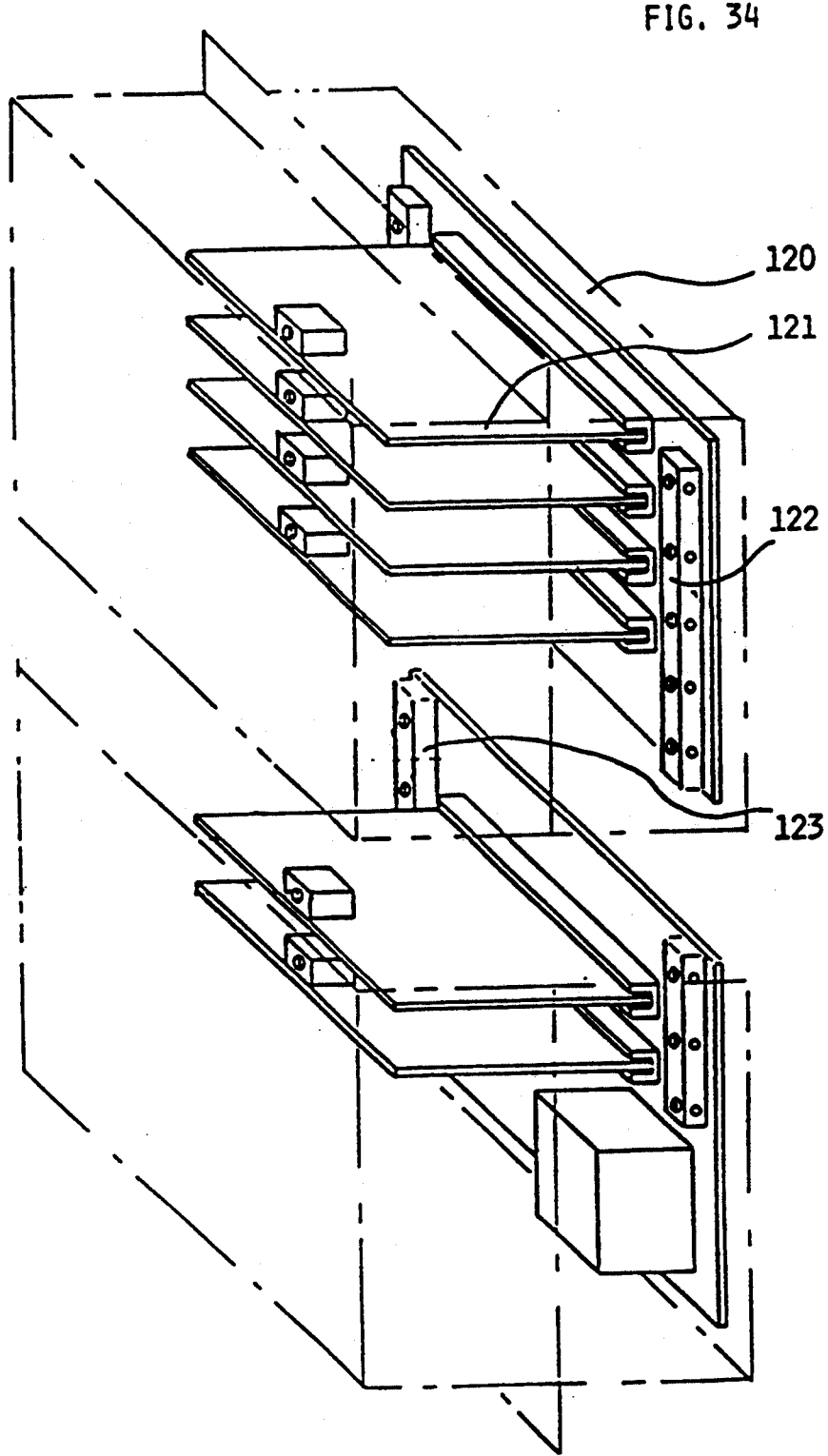
FIG. 34 shows an example of an electronic facility for controlling and regulating power in each zone.

FIG. 34 shows an example of an electronic facility 120 for controlling and regulating power in each zone of modules of the invention. The facility contains one power modulating card 121 per zone.

These cards act as actuators by means of triacs or power relays. They are driven by wave trains or by a phase wave or by any other compatible technique. The cards are mounted in a rack on a modular support suitable for matching the number of cards to the number of heater zones. When two hot plates are used or when a multiplicity of intermediate plates are used, it is also possible to provide microprocessor regulation for the top and bottom modules. Input and output terminal strips 122 and 123 provide connections to an electrical power distribution cabinet and with the various heater elements and measurement means.

Each of the cards is fitted with a manual potentiometer for setting power, capable of acting on each of the symmetrical superposed zones while still enabling regulation to be performed in each zone around two different reference points between the bottom module and the top module, while retaining adjustment independence between the various zones.

Figure 35:
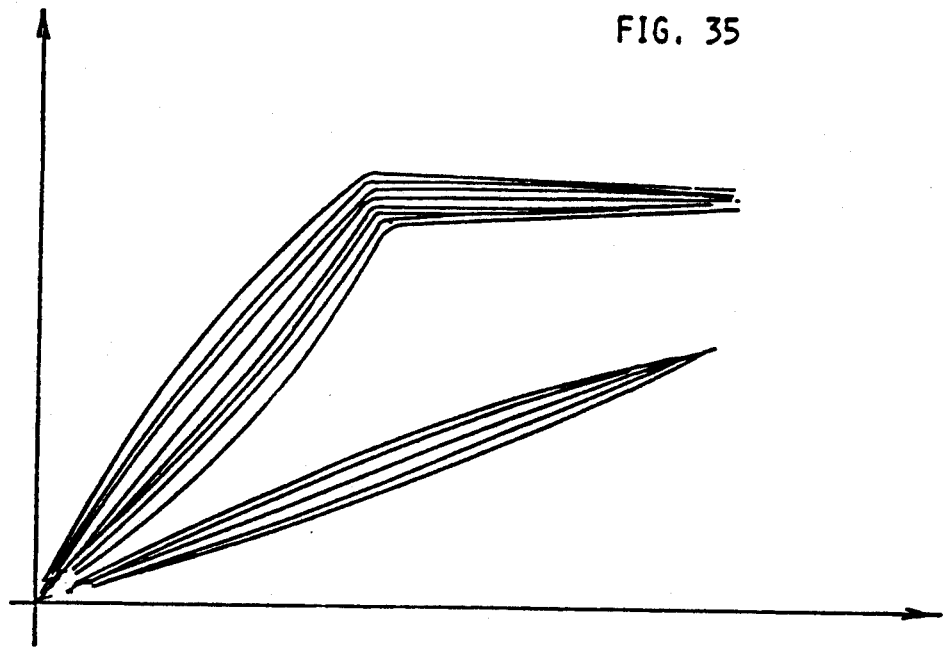
FIGS. 35 and 36 are graphs showing examples of curves for comparing the rise in temperature of a prior art type of hot plate and of a hot plate of the invention.

FIG. 35 is an example of temperature dispersion curves encountered on all known types of hot plates while the temperature of the plates is rising, and also while the plates are being maintained at an operating temperature level.

Figure 36:
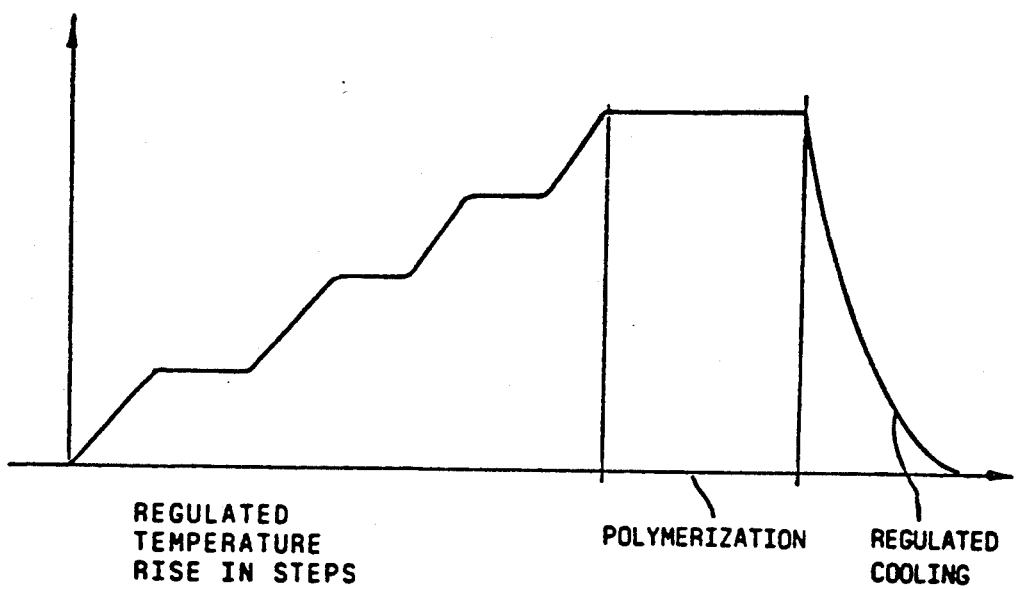

FIG. 36 shows an example of the temperature rise curve in operation in accordance with the invention. This temperature rise takes place by controlled temperature levels, without any dispersion since power is not delivered in full, but is delivered progressively up to a polymerization temperature level for the duration of a cycle which is calculated and adjusted as a function of the specific characteristics of each equipment. The same applies to cooling where the time required is not related to thermal shocks since these are absorbed mechanically.

Depending on requirements, power may be adjusted by various means of increasing complexity:

1) manually by means of one potentiometer per card;

2) automatically by means of a computer and software appropriate for this function, enabling the screen to display temperature values for each zone and for test points of the equipment;

3) automatically to optimize temperature uniformity over the surface of the modules by monitoring each zone by external probes placed at the center of the contact zone or between each module, defining comparable values between the reference point as measured by the sensor placed in the heat-distribution plate and the surface temperature of each zone, which differs between the center of the module and its corners and its margins;

4) automatically by optimizing the temperature uniformity over production molds or tooling which may be present in arbitrary quantities from one to n on the same plate; each mold is provided with temperature sensors co-operating with the electronic means or computer means for distributing heater power, thereby adjusting the heater power at the parts being manufactured while taking account of all heat dispersion due to the heat interchange surfaces of non-thermally insulated tooling, due to their different positions relative to the center, and due to their distances from the heater surface; and 5) automatically by operating regulation feedback loops, either using independent table regulators for each heater module, or else by using a computer system in which regulation software is programmed and which implements regulation algorithms, e.g. self-adaptive algorithms that provide higher performance than conventional proportional, integral and differential (PID) regulation.

This control of temperature regulation in multiple zones makes it possible to regulate a different value for the reference points by following the temperature rise profile and by improving the tolerance of the heating dynamic range during the various temperature rise(s) of the module (FIG. 36), thereby ensuring highly accurate uniformness over the, or each, temperature level in the cycle.

I claim:

1. High temperature electrical heater equipment for mounting n a rigid mechanical support (66), the equipment being of the type comprising:

a heat-distribution plate (60) at a distance from said mechanical support (66);

thermal insulation means (65) provided against said mechanical support (66) and on the lateral margins of said equipment;

electrical heater means and cooling means disposed between said heat-distribution plate (60) and said thermal insulation means (65); and temperature regulation means for maintaining a uniform temperature over the entire area of said temperature distribution plate (60) as a function of a manufacturing program;

the equipment being characterized in that:

a) the said electrical heater means and the said cooling means are disposed in independent layers between said thermal insulation means (65) and said heat-distribution plate (60);

b) the electrical heater means comprise a heater submodule (61) situated adjacent to said heat-distribution plate (60) and a heat return plate (64) fixed to said heater submodule (61) on the opposite side to said heat-distribution plate (60);

c) the heater submodule (61) includes a plurality of flat and solid metal-clad heater elements (62) disposed across the width of the said heat-distribution plate (60) and spaced apart by spacer blocks (63);

d) each heater element (62) includes at least three electrical resistances (X1, X2, X3) which are separate from one another and distributed in the lengthwise direction of the element;

e) the heater elements (62) are distributed along the length of said heat-distribution plate (60) in at least three zones, thereby defining at least nine different juxtaposed and joining heater zones (Z1, ..., Z9) by virtue of the electrical resistances (X1, X2, X3) being distributed across the width of said heat distribution plate (60);

f) the heat-distribution plate (60) includes a temperature sensor (TC) in each heater zone (Z1, ..., Z9) and g) the electrical resistances in each zone are electrically powered independently from the electrical resistances in the other heater zones via electronic power feed means for each zone, and as a function of predetermined references for each heater zone co-operating with said temperature sensors, said power feed means for each zone being regulated by a PID regulator.

2. Equipment according to claim 1, characterized in that the cooling means comprise:

a cooling module (72) having a plurality of independent cooling circuits (73) connected in parallel and spaced apart by spacer blocks, said cooling circuits being servo-controlled by electrically controlled valves governed by an electronic control circuit; and a second heat return plate (75) fixed to the cooling module on the side opposite to said heat-distribution plate (60).

3. Equipment according to claim 2, characterized in that the cooling means (72, 75) are interposed between the heat distribution plate (60) and the electrical heater means.

4. Equipment according to claim 2, characterized in that the electrical heater means are interposed between the heat distribution plate (60) and the cooling means.

5. Equipment according to claim 4 characterized in that the peripheral heater zones are preferably different in area from the central heater zones.

6. Equipment according to claim 5, characterized in that some zones, at the corners and at the margins of the equipment, are associated with electrical resistances of different powers.

7. Equipment according to claim 6, characterized in that the electronic power feed means for each zone comprise, for each heater zone, an electronic power modulating card (121) fitted with a manually adjustable potentiometer for setting electrical power.

8. Equipment according to claim 7, characterized in that it further includes a computer provided with software suitable for regulating the electronic power feed means for zone as a function of predetermined references for each heater zone.

9. Equipment according to claim 8, characterized in that each electrical resistance is fitted with its own temperature measuring sensor connected to the computer.

10. Equipment according to claim 1 characterized in that the rigid mechanical support (66) is the table or frame of a press for manufacturing products from plastic material and from composite materials.

* * * * *